JACOB RAND.
Improvement in Arbors for Saws and Grooving Tools.
No. 115,103. Patented May 23, 1871.
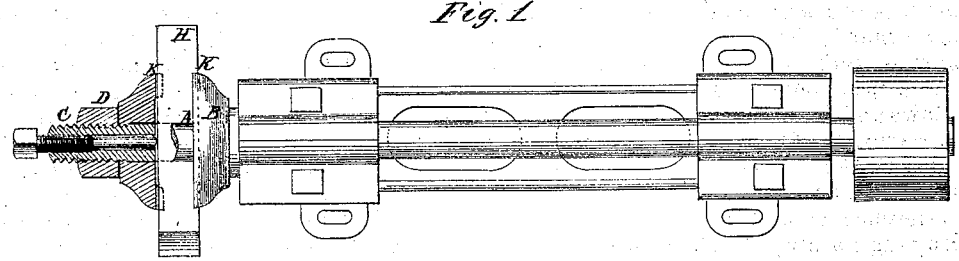
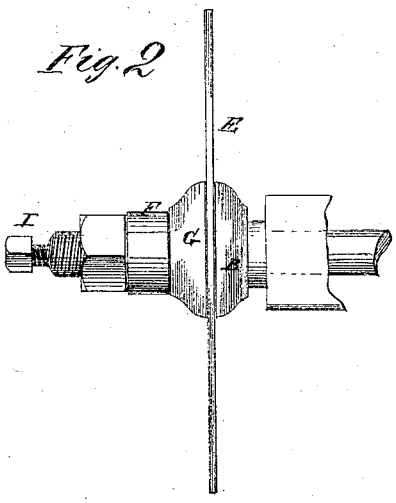
Witnesses:
A. W. Almqvist.
Wm. H. C. Smith.
Inventor:
J. Rand.
Per Wm ___
Attorneys.

115,103

UNITED STATES PATENT OFFICE.

JACOB RAND, OF BOSTON, MASSACHUSETTS.

IMPROVEMENT IN ARBORS FOR SAWS AND GROOVING-TOOLS.

Specification forming part of Letters Patent No. 115,103, dated May 23, 1871.

*To all whom it may concern:*

Be it known that I, JACOB RAND, of Boston, in the county of Suffolk and State of Massachusetts, have invented a new and Improved Arbor for Saws and Grooving-Tools; and I do hereby declare that the following is a full, clear, and exact description thereof, which will enable others skilled in the art to make and use the same, reference being had to the accompanying drawing forming a part of this specification.

This invention relates to improvements in arbors for saws, by which it is designed to adapt them for holding tools for grooving, rabbeting, matching, sash-sticking, and beading, so that the one arbor-table and driving-gear may be utilized for various kinds of work, the tools only being changed.

Figure 1 is a plan and sectional view of the improved arbor, showing the application of a grooving-tool; and Fig. 2 is a side elevation with the saw applied.

Similar letters of reference indicate corresponding parts.

The neck A of the arbor is made longer between the fixed collar B and the screw-threaded part C, by which the clamping-nut D is applied, and when the saw E is to be used a long sleeve or washer, F, is applied between the nut D and the loose collar G, and the said neck has a radial mortise through it next to the fixed collar for the application of grooving, beading, rabbeting, or other tools of like character, such as shown by H, Fig. 1, which are passed through the mortise and clamped against the fixed collar, as clearly indicated in the drawing, by the clamping-nut screwing directly against the loose collar, the washer being removed in consequence of the said tools being thicker than the saw. But these tools will vary considerably in width, so as not to fill the mortise in the neck A; consequently, I provide the clamp-screw I in the end of the arbor for holding the tools temporarily after being adjusted, and until the collar can be screwed up. The collars B and G may have radial grooves in their faces for reception of the edges of the tools, as indicated at K, if preferred, but they will hold the tools well without them.

Having thus described my invention, I claim as new and desire to secure by Letters Patent—

An arbor with the neck A, the fixed collar B, the movable collar G, the threaded sleeve F, and the screw I, all combined and adapted to be used together, as and for the purpose specified.

JACOB RAND.

Witnesses:
S. A. BOLSTER,
E. K. DEXTER.